June 27, 1950 W. S. HALSTEAD 2,512,641

PILLOW RADIO RECEIVER

Filed April 28, 1947

INVENTOR
WILLIAM S. HALSTEAD

BY Arthur A. Smith

ATTORNEY

Patented June 27, 1950 2,512,641

UNITED STATES PATENT OFFICE 2,512,641

PILLOW RADIO RECEIVER

William S. Halstead, Purchase, N. Y., assignor, by mesne assignments, to Farnsworth Research Corporation, a corporation of Indiana Application April 28, 1947, Serial No. 744,378

4 Claims. (Cl. 250—14)

This invention relates to radio receivers and more particularly to portable radio receivers for individualized reception wherein the reproduced signals are confined to the space immediately adjacent to the receiver.

Most portable radio receivers include a carrying case in which is arranged a multiplicity of components such as vacuum tubes, capacitors, resistors, batteries and the like. Portable receivers of this type are current consuming devices and also are subject to breakage. Furthermore, they periodically require servicing, adjusting and the replacement of components.

There are many uses for a portable type of radio receiver, such as to provide entertainment to listeners in the home, in the hospital or while traveling by train, bus, aircraft, or other means. The simultaneous use of a plurality of portable radio receivers within the confines of a hospital room or of a vehicle may cause considerable annoyance to the listeners and also to others who may desire rest or quiet. One expedient which has been employed to provide the individualized reception comprises an entertainment system which includes a centrally located receiver or receivers conductively connected to loud-speakers or earphones for the dissemination of program material to the respective members of a listening group. All of such systems employ entangling appurtenances, such as plug-in connections and earphones which periodically require manipulation and at all times constitute hazards to the movements of the users.

Consequently, there is need for a portable type of radio receiving apparatus which is free of most of the objectionable features present in prior art receivers of this character. Specifically, the receiver should be a self-contained unit so that it does not require physical connection to a wire system. Furthermore, it should be capable of providing good reception of any one of a plurality of programs. In addition, the sound reproduction should be at such a relatively low level so as not to cause annoyance to other persons in the room. At the same time, the receiver should be designed so as not to encumber the listeners with sound reproducing apparatus such as earphones.

Therefore, an object of the present invention is to provide an improved portable radio receiver for selectively rendering entertainment or other intelligence to a specific listener without causing interference to other persons in the immediate vicinity.

Another object of the present invention is to provide a portable radio receiver arranged within the confines of a sanitary pillow structure which is adapted to provide audible program material in addition to a degree of physical comfort to the listener in the manner of a headrest cushion.

A still further object of the present invention is to provide a lightweight portable radio receiver which is resiliently protected against damage by impact or shock and which may be readily folded for packing within a relatively small area.

Another and different object of the present invention is to provide a portable radio receiver wherein the components employed normally will not require replacement, thereby dispensing with the need for servicing or maintenance.

Yet another object of the present invention is to provide a portable radio receiver embodied within a flexible pillow structure and adapted to function without the necessity of batteries or external power connections.

In accordance with this invention there is provided a portable radio receiver which preferably has the form of a headrest of resilient material, such as a pillow, for example. An antenna is embedded in the headrest adjacent to the periphery thereof. Similarly, a loud-speaker is embedded in the headrest at a convenient point, such as at the center thereof, for example. Finally there is provided a tuning element which is operably associated with the antenna and with the loud-speaker and which also is attached to or embedded in the headrest on the periphery thereof.

For a better understanding of the invention, together with other and further objects thereof, reference is made to the following description, taken in connection with the accompanying drawings and its scope will be pointed out in the appended claims.

By the drawings, Fig. 1 is an elevational view of the pillow radio receiver wherein a portion thereof is shown in sectional view to expose the interior.

Figure 1:
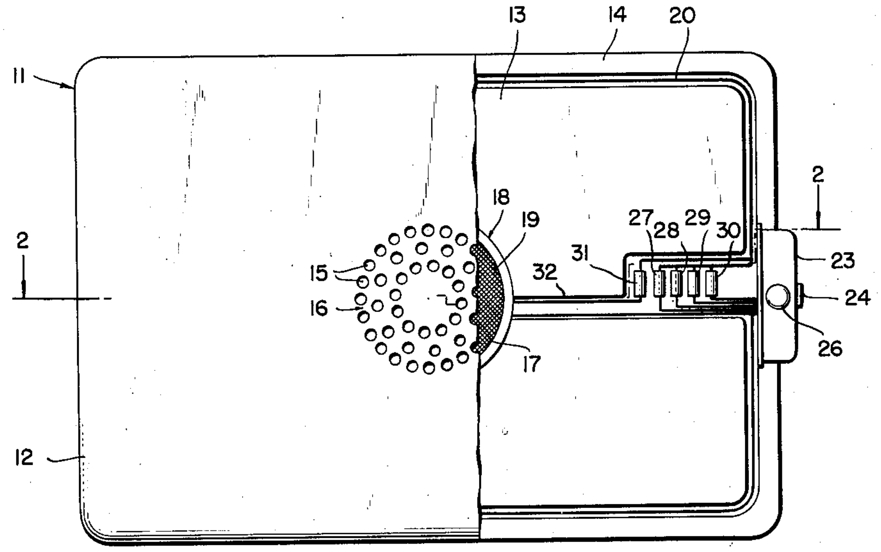
Figure 2:
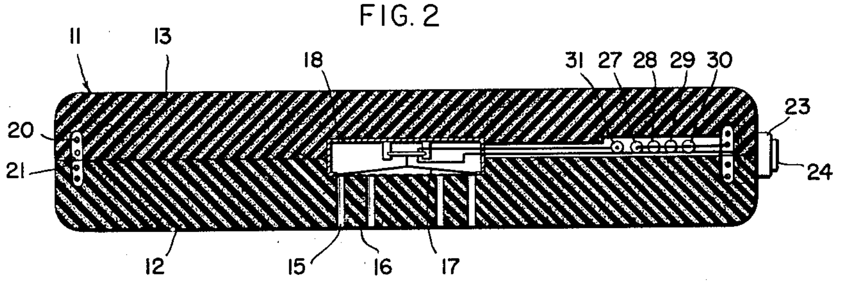
Fig. 2 is a sectional view of the pillow structure taken on lines 2—2 of Fig. 1.

Referring now more particularly to Figs. 1 and 2 of the drawings, the pillow 11 is formed of a front pad 12 and a rear pad 13. These pads preferably are composed of a molded porous rubber compound having a multiplicity of air cells contained therein. Such a substance has a marked similarity to sponge rubber or rubberized foam which is known to possess a high degree of flexibility and resilience. At the peripheries of the front pad 12 and of the rear pad 13, rims such as 14, are adapted to provide smooth plane surfaces which, in the process of manufacture, may be coated with a rubberized cement, or the like, so that they may be joined together to form a unitary pillow structure.

The front pad 12 has centrally formed therein a plurality of apertures 15 adapted to serve as a sound vent 16. The sound vent 16 is in direct alignment with the diaphragm 17 of a loud-speaker 18 to thereby permit the outward passage from within the pillow structure of sound waves which may be generated by the loud-speaker. A metallic screen 19 is inserted for protective purposes between the rear surface of pad 12 and the diaphragm 17. The loud-speaker 18 may comprise a "crystal" type transducer and may be centrally mounted within the pillow structure in a form fitting compartment or chamber of the pad so as to obviate bumps or bulges in the pillow surface.

There is provided, for signal pick-up purposes, a flexible loop antenna 20 comprising a continuously wound spiral of wire having a sufficient value of inductance for tuning purposes. Antenna 20 is embedded in another pad compartment which has the form of a channel or groove 21 extending completely around the edge of the pillow 11 adjacent to the periphery thereof. The antenna is operably connected, as will be hereinafter described, to the tuning elements of the receiver.

A tuning switch 23 is provided for the purpose of tuning the receiver apparatus and it is suitably affixed upon the periphery of the pillow 11 so that it is readily accessible to the listener. The switch is provided with a control button 24 and a channel indicator 26. A plurality of tuning capacitors 27, 28, 29 and 30 are provided for operation in conjunction with the switch for channel selecting purposes. The receiver apparatus also includes a miniature rectifier 31 of the silicon or germanium type. The output circuit of the receiver is coupled to the loud-speaker 18 by a circuit which includes the conductor 32.

Figure 3:
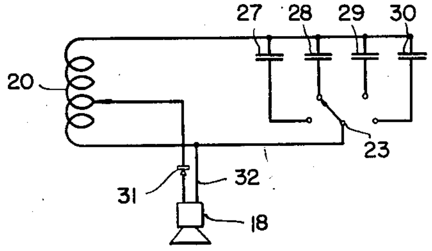
Fig. 3 is a diagram of a receiver circuit applicable for use in the pillow radio receiver.

By referring to Fig. 3, the circuit connections of the receiving apparatus may be seen. The tuning switch 23 may comprise a device having a plurality, such as four, separate positions for operably connecting any one of the four tuning capacitors with the receiving circuit. It will be understood that the channel indicator 26 (Fig. 1) may be arranged to give a visual indication of the particular entertainment channel to which the control button 24 has been positioned. According to the present illustration, the channel indicator shows that the tuning switch is adjusted to render the receiver responsive to channel No. 2 of four available channels, for example. In the present instance the four program channels are made selectively operative by means of the respective tuning capacitors 27, 28, 29 and 30. It will be apparent that these capacitors each may have a different value of capacitance so that, by means of the tuning switch 23, each may be individually coupled across the inductance device constituted by the loop antenna 20, so as to establish circuit resonance at a particular radio frequency.

Referring again to Figs. 1 and 2, there is shown one method of physically mounting the tuning capacitors 27, 28, 29 and 30 and the rectifier 31 within the structure of pillow 11. These particular components are then electrically connected between the loud-speaker 18, the loop antenna 20 and the tuning switch 23. The conductive wiring, such as conductor 32, and the loop antenna 20, preferably are fabricated so as to provide extreme flexibility.

Referring now to the operation of the apparatus embodying the present invention, the operator adjusts the tuning control button 24 to the particular channel desired, which is indicated by the channel indicator 26. The switch 23 completes the connection of the proper tuning capacitor across the terminals of the loop antenna 20 to resonate the receiver circuit to the frequency of the desired channel. As a consequence, there is developed an appreciable signal voltage within the antenna. The rectifier 31 demodulates the received signal voltage which then is impressed upon the loud-speaker 18. The loud-speaker audibly reproduces these signals at the proper level so that they may be heard only by placing the ear of the listener close to the sound vent 16 in the pillow. The choice of program material may be readily changed by suitably altering the position of the tuning switch 23 by means of the control button 24.

The flexibility of the wire contained within the pillow 11, in conjunction with the inherent flexibility and resiliency embodied in the pads 12 and 13 will permit the user to fold or roll the pillow 11 so that it may assume relatively small dimensions for packing or carrying purposes. It will be understood that the resilient pillow 11, in conjunction with the relatively rugged nature of the receiver components contained therein, provides a receiver device which is substantially impervious to damage which may be caused by a sudden impact such as may be delivered when the pillow 11 is dropped. A further advantage herein gained by the use of the structure and components described in the present invention resides in the fact that the need for periodic servicing or maintenance is practically eliminated. At the same time, external connectors or cables have been completely dispensed with by means of the unitary structure disclosed.

It is contemplated that this pillow structure and its self-contained receiver apparatus in accordance with the invention will provide for the listener an improved individualized means of entertainment. The present invention may be employed in the home or the hospital without engendering the slightest possibility of its becoming an annoyance to other persons in the immediate vicinity inasmuch as the received signals may only be heard by the user who, necessarily, shall be in relatively close proximity to the pillow. It is further considered that the traveling public will be immensely benefited by this device inasmuch as the pillow structure in itself provides a degree of physical comfort when employed as a headrest cushion. It will be understood that this pillow receiver will provide an added and an attractive adjunct to the services already rendered by the train, bus, or aircraft operators. This receiver device, for instance, is exceptionally efficient when employed within a vehicle which is adapted to inductively radiate program material within its interior for passenger entertainment purposes.

While there has been described what, at present, is considered the preferred embodiment of the invention, it will be obvious to those skilled in the art that various changes and modifications may be made therein without departing from the invention, and it, therefore, is aimed in the appended claims to cover all such changes and modifications as fall within the true spirit and scope of the invention.

What is claimed is:

1. A portable radio receiver comprising, a pair of porous resilient pads each having an inner face provided with a plurality of preformed chambers, the inner faces of said pads being adapted to be joined to each other at the peripheries thereof to form a resilient pillow structure, a flexible loop antenna mounted between said resilient pads in one of said chambers adjacent to the peripheries thereof, a loud-speaker centrally mounted in another one of said chambers between said pads, a sound vent in one of said pads in alignment with the diaphragm of said loud-speaker, and signal tuning elements mounted between said pads in still another one of said chambers and operably connected to said loop antenna and to said loud-speaker.

2. A portable radio receiver comprising, a first resilient pad having a first preformed chamber formed in its inner face, a second resilient pad having a second preformed chamber formed in its inner face, a sound vent located in said first resilient pad in alignment with said first chamber, a metallic screen mounted in said first resilient pad to provide a protected area for said sound vent, means for joining said resilient pads around the peripheries thereof to provide a pillow structure, a loop antenna within said pillow, a loud-speaker mounted in a compartment formed within said pillow by said first and second chambers and adapted to reproduce signals through said sound vent, radio receiver tuning means within said pillow and operably connected to said loop antenna and to said loud-speaker, and switching means affixed to said pillow and operably connected to said radio receiver tuning means.

3. A portable radio receiver comprising, a first resilient rubber pad having its inner face provided with a first centrally located preformed compartmental recess, a sound vent formed in said first pad and comprising a plurality of relatively small apertures communicating with said first central recess, a metallic screen located in said first central recess to provide a protected area for said sound vent, a second resilient rubber pad having its inner face provided with a second centrally located compartmental recess, means for joining the inner faces of said rubber pads around the peripheries thereof to provide a resilient pillow structure having a closed compartment formed by said recesses, radio receiving means mounted between said pads and comprising a loud-speaker located in said closed compartment for reproducing signals through said sound vent, a loop antenna within said pillow, a variable signal tuning circuit and a rectifier within said pillow and coupled to said loop antenna and to said loud-speaker, and means affixed to said pillow for adjusting the signal tuning circuit.

4. A portable radio receiver comprising, a first resilient rubber pad having preformed compartmental recesses formed in one side thereof, a sound vent consisting of a plurality of relatively small apertures formed in said first rubber pad and extending through said pad from a centrally located one of said recesses to the other side of said pad, a metallic screen attached to said central recess of said first rubber pad to provide a protected area for said sound vent, a second resilient rubber pad having formed in one side thereof compartmental recesses corresponding in arrangement to the recesses of said first rubber pad, means for joining the compartmentally recessed sides of said rubber pads around the peripheries thereof to provide a resilient pillow structure having a plurality of compartments internally formed therein by said corresponding recesses, radio receiving means mounted between said pads and comprising a loud-speaker located in the central one of said compartments within said pillow and adapted to reproduce signals through said sound vent, a loop antenna located around the periphery of said pillows within another of said compartments, a variable tuning circuit and a crystal rectifier mounted within still another one of said compartments within said pillow structure and coupled to said loop and to said loud-speaker, and means affixed to said pillow structure for adjusting the signal tuning circuit.

WILLIAM S. HALSTEAD.

REFERENCES CITED

The following references are of record in the file of this patent:

UNITED STATES PATENTS

| Number | Name | Date |
|---|---|---|
| Re. 19,051 | Nicholson | Jan. 16, 1934 |
| 1,712,158 | Neal | May 7, 1929 |
| 1,864,615 | Quinby | June 28, 1932 |

FOREIGN PATENTS

| Number | Country | Date |
|---|---|---|
| 203,716 | Great Britain | 1925 |
| 299,161 | Great Britain | Oct. 25, 1928 |